(12) United States Patent
Appleyard et al.

(10) Patent No.: US 8,151,667 B2
(45) Date of Patent: Apr. 10, 2012

(54) STEERING COLUMN ASSEMBLY

(75) Inventors: Michael Appleyard, Cheltenham (GB); David Ward, Monmouth (GB)

(73) Assignee: TRW Lucas Varity Electric Steering Limited (GB)

( * ) Notice: Subject to any disclaimer, the term of this patent is extended or adjusted under 35 U.S.C. 154(b) by 651 days.

(21) Appl. No.: 11/991,293

(22) PCT Filed: Aug. 18, 2006
(Under 37 CFR 1.47)

(86) PCT No.: PCT/GB2006/003081
§ 371 (c)(1),
(2), (4) Date: Apr. 29, 2009

(87) PCT Pub. No.: WO2007/026114
PCT Pub. Date: Mar. 8, 2007

(65) Prior Publication Data
US 2009/0301254 A1    Dec. 10, 2009

(30) Foreign Application Priority Data
Sep. 1, 2005   (GB) .................................. 0517780.3

(51) Int. Cl.
*B62D 1/18* (2006.01)
(52) U.S. Cl. ........................................................ 74/493
(58) Field of Classification Search .................... 74/493; 280/775, 779, 780
See application file for complete search history.

(56) References Cited

U.S. PATENT DOCUMENTS

| | | | | |
|---|---|---|---|---|
| 4,648,624 A * | 3/1987 | Mouhot et al. | ................. | 280/775 |
| 6,282,978 B1 * | 9/2001 | Kurita | ............................. | 74/493 |
| 6,450,531 B1 * | 9/2002 | Rinker et al. | ................. | 280/775 |
| 6,623,036 B2 * | 9/2003 | Yamamura et al. | ........... | 280/775 |
| 2002/0178857 A1 | 12/2002 | Matsumiya | | |
| 2005/0001445 A1 * | 1/2005 | Ercolano et al. | ............. | 296/97.7 |
| 2005/0050978 A1 * | 3/2005 | Lee | ................................... | 74/493 |
| 2005/0104353 A1 | 5/2005 | Ikeda et al. | | |

FOREIGN PATENT DOCUMENTS

| | | |
|---|---|---|
| GB | 1 287 403 A | 8/1972 |
| GB | 2304866 | 3/1997 |
| GB | 2380243 | 4/2003 |
| JP | 2002/096741 | 4/2002 |
| WO | WO 2005/037627 A | 4/2005 |

* cited by examiner

*Primary Examiner* — Vicky Johnson
(74) *Attorney, Agent, or Firm* — MacMillian, Sobanski & Todd, LLC

(57) ABSTRACT

A steering column assembly comprises a steering column shroud which supports a steering shaft for a steering wheel, a support bracket which is fixed in position relative to a part of vehicle, and a clamp mechanism which is movable between a locked position in which the clamp mechanism fixes the shroud in position relative to the support bracket and an unlocked position in which the clamp mechanism permits movement of the shroud relative to the support bracket. The support bracket comprises a generally U-shaped member with two depending arms of the U extending from its base having a portion of the column shroud located therebetween. A clamp mechanism is also provided which upon locking of the clamp mechanism provides tension between the two arms of the U shaped member together thereby clamping the steering column shroud in position. One arm of the U-shaped member comprises an outer leaf extending from the base to a free end of the arm and an inner leaf connected to the free end of the arm and extending upwards from the free end towards the base, the inner leaf being located between outer leaf and the other arm of the U-shaped member, the clamp mechanism acting to apply tension between the inner leaf and the other arm such tension acting to pull the inner leaf away from the outer leaf.

12 Claims, 4 Drawing Sheets

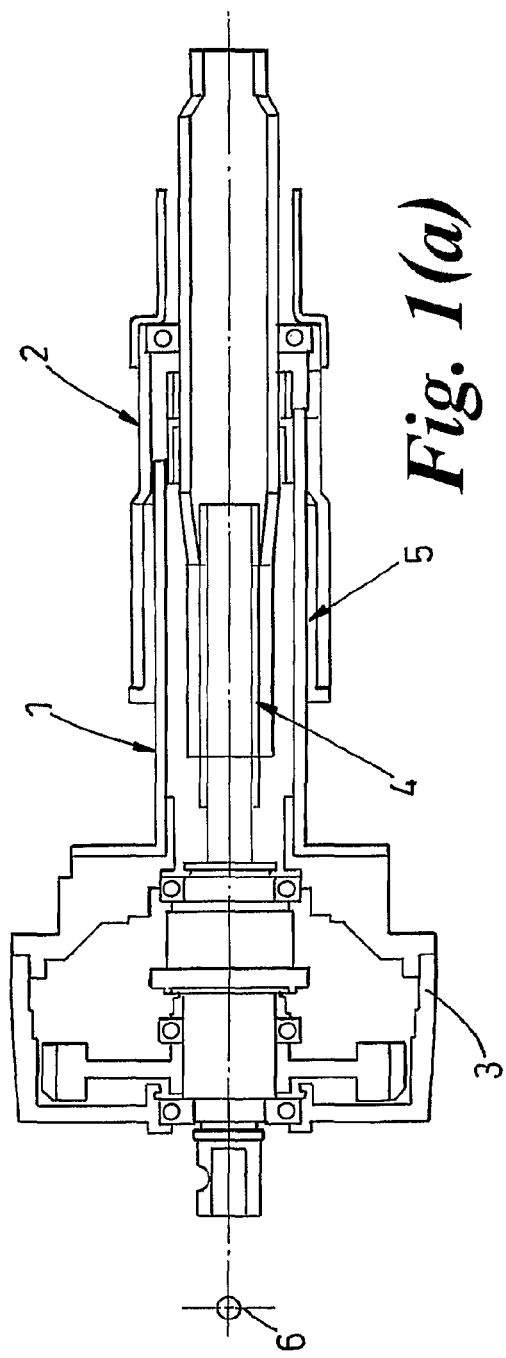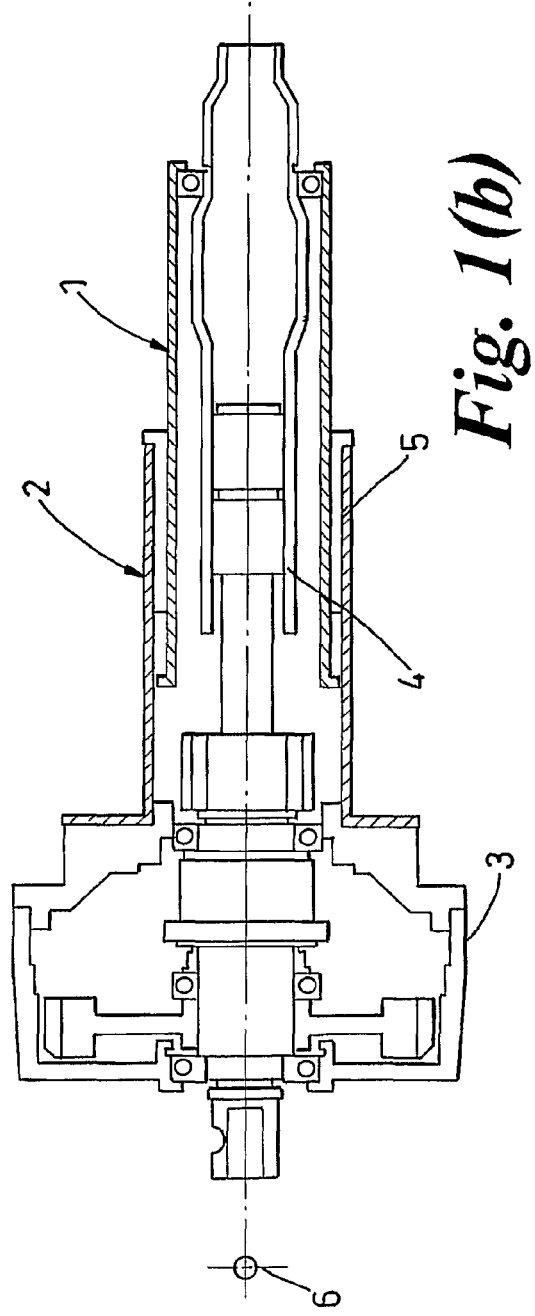

STEERING COLUMN ASSEMBLY

CROSS-REFERENCE TO RELATED APPLICATIONS

This application is a National Stage of International Application No. PCT/GB2006/003081 filed Aug. 18, 2006, which claimed priority to Great Britain Patent Application No. 0517780.3 filed Sep. 1, 2005, the disclosures of both are incorporated herein by reference in their entirety.

BACKGROUND

Various embodiments of a steering column assembly are described herein. In particular, the embodiments described herein relate to improvements in steering column assemblies, and to a support bracket for such assemblies.

Steering column assemblies for automotive vehicles and the like are increasingly required to be adjustable for rake and, in many cases, reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

One common arrangement uses a telescopic column shroud which comprises two tubes which slide one inside the other to permit reach adjustment. A fixing rail welded to one of the tubes is secured to a support bracket by the releasable clamp mechanism. Rake adjustment can be achieved by providing a support bracket which includes vertically extending slots through which the clamp mechanism passes. The clamp mechanism, which is secured to the fixing rail, can be moved vertically within these slots, taking the column with it to adjust rake.

A known arrangement for use in restricted spaces utilizes a bracket in the form of an inverted U-shape having two arms depending from a base which have the vertical slots formed therein. The clamp mechanism includes a bolt which passes through the slots to link the arms together and the column is located between the arms. Tightening the bolt draws the arms together to squeeze them onto the column.

BRIEF SUMMARY

According to a first aspect there is provided a steering column assembly comprising a steering column shroud which supports a steering shaft for a steering wheel, a support bracket which is fixed in position relative to a part of vehicle, and a clamp mechanism which is movable between a locked position in which the clamp mechanism fixes the shroud in position relative to the support bracket and an unlocked position in which the clamp mechanism permits movement of the shroud relative to the support bracket, in which the support bracket comprises a generally U-shaped member with two depending arms of the U extending from its base having a portion of the column shroud, located therebetween, and a clamp mechanism which upon locking of the clamp mechanism provides tension between the two arms of the U shaped member together thereby clamping the steering column shroud in position, characterized in that one arm of the U-shaped member comprises an outer leaf extending from the base to a free end of the arm and an inner leaf connected to the free end of the arm and extending upwards from the free end towards the base, the inner leaf being located between outer leaf and the other arm of the U-shaped member, the clamp mechanism acting to apply tension between the inner leaf and the other arm.

By providing a bracket in which one arm is effectively folded back on itself through 180 degrees by outer and inner leaves connected at their free end there is an increased overall inwards flexibility compared with a single leaf arm. This is especially advantageous where space restrictions limit the length of the arms of the bracket that can be used. Furthermore, the magnitude of this flexibility is less dependent upon the rake position of the steering column. This invention therefore addresses a problem appreciated by the applicant which occurs where space is limited to such an extent that the length of the arms of the bracket must be minimized. In this case, with a simple single leaf bracket the overall amount of flex of the arms for a given clamping force will vary depending on the rake position of the column. If the column is at its highest, so that the clamp is acting near to the base of the bracket, the arms will deflect less for a given clamp force than when it is at its lowest position. This is ameliorated by the clamp acting on the inner leaf.

The base of the U shaped bracket is preferably located above a portion of the column assembly, as is the clamp mechanism. Thus, the base may be located horizontally above the portion of the steering column with the arms depending vertically downwards such that the U-shape is inverted.

The inner leaf and outer leaf of the one arm may be integrally formed. Most preferably they are formed by providing an over length arm and bending it back on its self at a point along its length corresponding to the desired length of the outer leaf. This is convenient and relatively inexpensive.

Alternatively, the inner leaf may comprise a separate component which is secured to the outer leaf at or near the free end of the arm. It may be secured by welding, perhaps using two or more spot welds. It could, of course, be fixed by any other known technique depending upon the choice of materials used for the inner and outer leaf.

Whilst providing the inner and outer leaf as separate components is more complex and potentially more complex than bending, it may allow the properties of the inner and outer leaves to differ. Different materials or thicknesses of material could be used.

The clamp mechanism may include a clamp bolt that connects the inner leaf and the other arm. The bolt may comprise a shaft which may be provided with a nut or bolt head at one end with the shaft and bolt head/nut passing cleanly through an opening (such as a hole or slit) in the outer leaf yet prevented from passing through an opening in the inner leaf and continuing to pass through an opening in the other arm whereupon a means for drawing the shaft towards the other arm is provided. This may take the form of a cam which acts between the arm and a fixed nut or head fixed to the end of the shaft.

Alternatively, the inner leaf may be provided with a thread which receives a complimentary thread on the shaft to fix the shaft to the inner leaf. In a still further alternative the clamp shaft may be welded or otherwise fixed to the inner leaf. Whatever arrangement is chosen, it is important that when the clamp shaft is pulled towards the other arm it only pulls on the inner leaf and not the outer leaf, with the inner leaf in turn pulling on the outer leaf.

The other arm may be of greater rigidity than the arm with the inner and outer leaves, providing a relatively fixed datum for securing the column and ensuring that overall lateral stiffness remains adequate.

The shroud may be telescopic and may comprise an inner member and an outer member, the inner member being at least partially received within the outer member.

The arms of the U-shaped member may clamp on to a portion of the outer or inner members, or to a fixing rail secured thereto. The engagement between the inner leaf and the fixing rail (or other part) is preferably over a smaller vertical distance than the engagement between the fixing rail (or other part) and the more rigid arm. By vertical distance we mean the distance vertically when the arms of the bracket are considered to be aligned vertically. This ensures that small deformations of the inner leaf out of the vertical as the clamp mechanism is locked are absorbed without any significant rotation of the column assembly.

The clamp assembly may be arranged such that when the clamp is in the unlocked position the rake of the steering column can be adjusted whilst the inner and outer members remain fixed relative to one another. This is known as a single adjust mechanism.

Additionally, the clamp when in the unlocked position may permit the inner member to move relative to the outer member to provide for reach adjustment, this movement being prevented when the clamp mechanism is moved to its locked position. This is known as a double adjust mechanism. This arrangement therefore permits both rake and reach adjustment from a single unlocking of the clamp mechanism.

In one embodiment of a double adjust mechanism the outer member, or the fixing rail, may be provided with one or more slits in the region fixed by the clamp such that the action of locking the clamp closes the slits and so deforming the outer member so that it grips the inner member. It may grip it directly or indirectly, e.g. through an intermediate member. The intermediate member may be chosen so as to provide a require friction between the inner and outer members.

The inner and outer members may each be substantially tubular, with the outer member having at least one elongate slit along its length at least in the region clamped by the clamping mechanism whereby the effective diameter of the outer member is reduced upon clamping to grip the inner member.

According to a second aspect the invention provides a support bracket for a steering column assembly which comprises a generally inverted U-shaped member having a base and two arms depending from it; at least one of the arms comprising an outer leaf extending from the base to a free end of the arm and an inner leaf connected to the free end of the arm and extending upwards from the free end towards the base, the inner leaf being located between the outer leaf and the other arm of the U-shaped member.

The inner and outer leaves may be formed by folding of a single member back on itself, preferably through 180 degrees.

The inner and outer leaves may comprise separate components connected by welding, bonding, riveting or the like.

Other advantages of the steering column assembly will become apparent to those skilled in the art from the following detailed description of the various embodiments, when read in light of the accompanying drawings.

BRIEF DESCRIPTION OF THE DRAWINGS

FIG. 1(a) is a general view in plan of a steering column assembly that is adjustable for reach and rake;

FIG. 1(b) is a general view of an alternative steering column assembly;

DETAILED DESCRIPTION

Figure 2A:
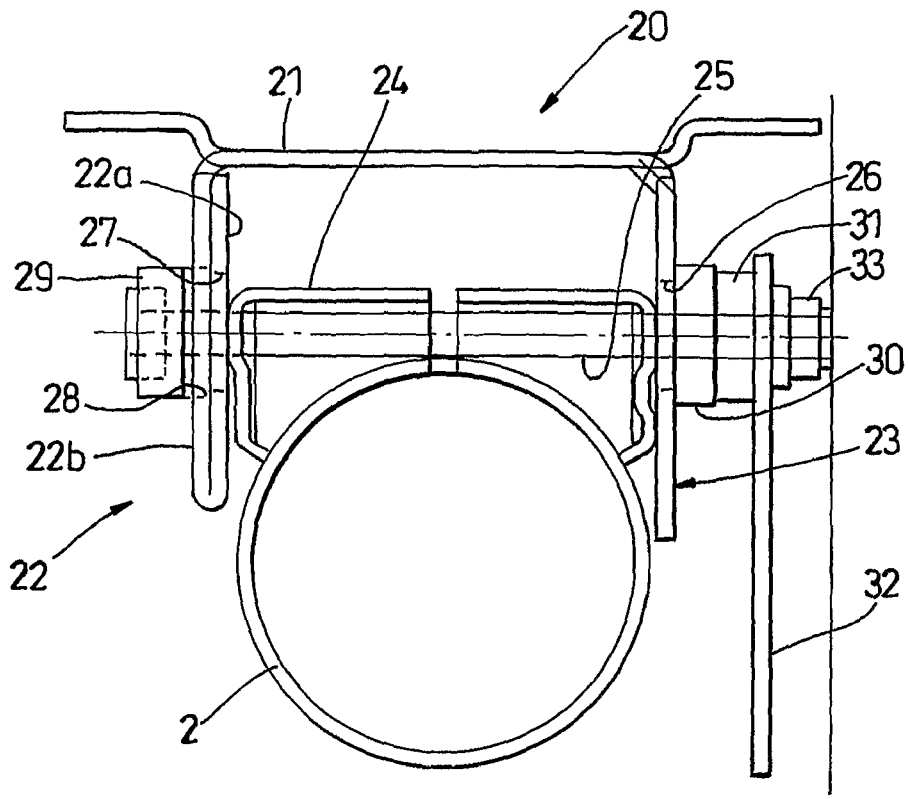
FIG. 2(a) is a cross section through a first embodiment of a clamp assembly of a steering column according to the invention when viewed along the axis of the steering column.

As shown in FIGS. 1(a) and 1(b), a steering column assembly comprises a telescopic steering column shroud comprising an inner member 1 and an outer member 2 which receives a portion of the inner member 1. The inner and outer members are of metal and tubular with the inside diameter of the outer member being only slightly greater than the outside diameter of the inner member so as to permit relative movement between them by sliding. In the example of FIG. 1(a), the inner member 1 passes into a gearbox housing 3 whilst the outer member 2 extends away from that towards a steering wheel. In FIG. 1(b) it is the outer member 2 that is connected to the gearbox housing 3. This housing may contain a gearbox in the case of an electric power steering system which is driven by an electric motor to provide an assistance torque.

The wheel (not shown) is supported by a telescopic steering shaft 4 that is free to rotate within the steering column shroud 1,2. A bush 5 (optional) of low friction material such as a soft plastic is located between the inner and outer members to control the friction that is generated when the two are moved over one another to extend or collapse the steering column either when adjusting reach of the steering wheel or in an accident.

The steering column shroud 1,2 is fixed pivotally to a part of the vehicle body at a point 6 and also to a support bracket (not shown in FIG. 1) secured to the body of the vehicle by a clamp mechanism. The bracket is typically welded or bolted in place in a region under the dashboard and clamps the shroud at a point somewhere between the pivot and the steering wheel. The clamp mechanism can be locked or unlocked to allow the rake of the steering column to be adjusted by pivoting about the pivot. When locked the steering column cannot be moved other than in an accident.

Figure 2B:
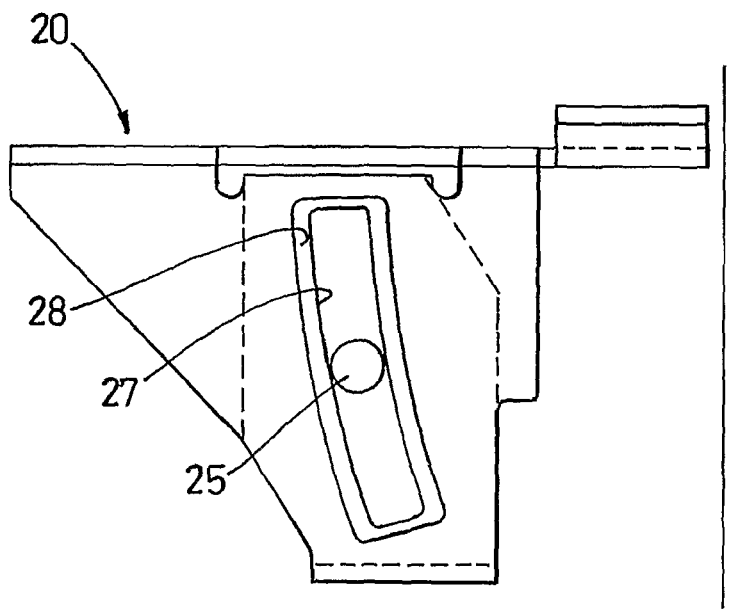
FIG. 2(b) is an alternative view of the bracket of FIG. 2(a) when viewed from the side.

The support bracket and the clamping mechanism of a first embodiment of the present invention are shown in detail in FIG. 2(a) and FIG. 2(b) of the accompanying drawings. The bracket 20 is in the form of a metal sheet pressed into an inverted U-shape, with the base 21 of the U lying in a generally horizontal plane above the steering column shroud 1,2. The two arms 22,23 of the U depend downwards in a generally vertical plane and extend down either side of a fixing rail 24 welded to the outer shroud member 2. A clamp mechanism acts between the two arms 22,23 to draw them together when locked so that they are squeezed onto the fixing rail 24, and in this case also pass through slits in the fixing rail (not shown). The purpose of these slits, which extend along in the direction of the long axis of the tubular members 1,2, is to allow the steering column to be telescoped for reach adjustment when the clamp mechanism is unlocked.

One arm 22 of the bracket is in two layers, and may therefore be considered to comprise an inner leaf 22a and an outer leaf 22b. The outer leaf 22b extends from the base 21 of the U-shape support 20 downwards and is then folded back on itself to form the inner leaf 22a. This inner leaf is located inside of the outer leaf (i.e. facing the other arm), and the line along which the fold is made defines the free end of the arm. The other arm 22 is of a more rigid construction but of a single leaf. The complete bracket 20 can therefore be produced by pressing and folding of a single metal sheet like component.

The clamp mechanism comprises a shaft 25 which passes through an elongate, substantially vertically extending, slot 26 in the more rigid arm towards the inner leaf of the other arm. It then continues to pass through another elongate, vertically extending, slot or opening 27 in the inner leaf and also an elongate, vertically extending, slot or opening 28 in the outer leaf 22b. A nut 29 on the end of the shaft outside the inner leaf 22a is located within the opening in the outer leaf 22b so as to exert no force on the outer leaf. This can be achieved by making the horizontal width of the opening in the outer leaf greater than the size of the nut 29. On the other hand, the nut 29 is prevented from passing through the inner leaf 22a when the shaft is pulled towards the other arm by suitable width of the elongate opening in the inner leaf 22a. The nut 29 is therefore larger than the opening in the inner leaf so that it cannot pass through. This can best be seen in FIG. 2(b) of the accompanying drawings.

The other end of the shaft 25 which is located outside of the more rigid arm 23 is secured with a cam mechanism that is provided between an adjustable nut 33 and the outer face of the more rigid leaf. The cam comprises a fixed portion 30 that is prevented from rotation and a moving portion 31 that together present cam faces that slide over one another. The moving portion 31 is operated by a lever 32 as shown or could be operated by an electric motor. Rotation of the moving cam portion 31 by rotation of the lever 32 to lock the clamp mechanism increases the length of the cam and this pushes the adjustable nut 33 away from the rigid arm 23, causing the shaft 25 to draw the inner leaf 22a of the other arm 22 towards the rigid arm 23. Rotation of the cam to unlock the mechanism has the effect of shortening the length of the cam and thus reduces the tension in the shaft, releasing the grip of the arms on the fixing bracket.

Because the clamp only directly acts to apply tension between the inner leaf 22a and the other arm 23, the amount of spring that can be provided in the arms can be relatively high for a given length of the arms. The inner leaf and outer leaf may therefore be considered to act as a wishbone spring, with the inner leaf pulling on the outer leaf as the clamp is locked. Significantly, variations in this spring due to movement of the bolt within the openings as occurs when adjusting rake only have a limited, if any effect on the springing force provided by the bracket when compared with arms that comprise only a single leaf. In that case, the nearer the shaft is to the root of the arm the greater the force exerted by the arms against clamping.

Figure 3A:
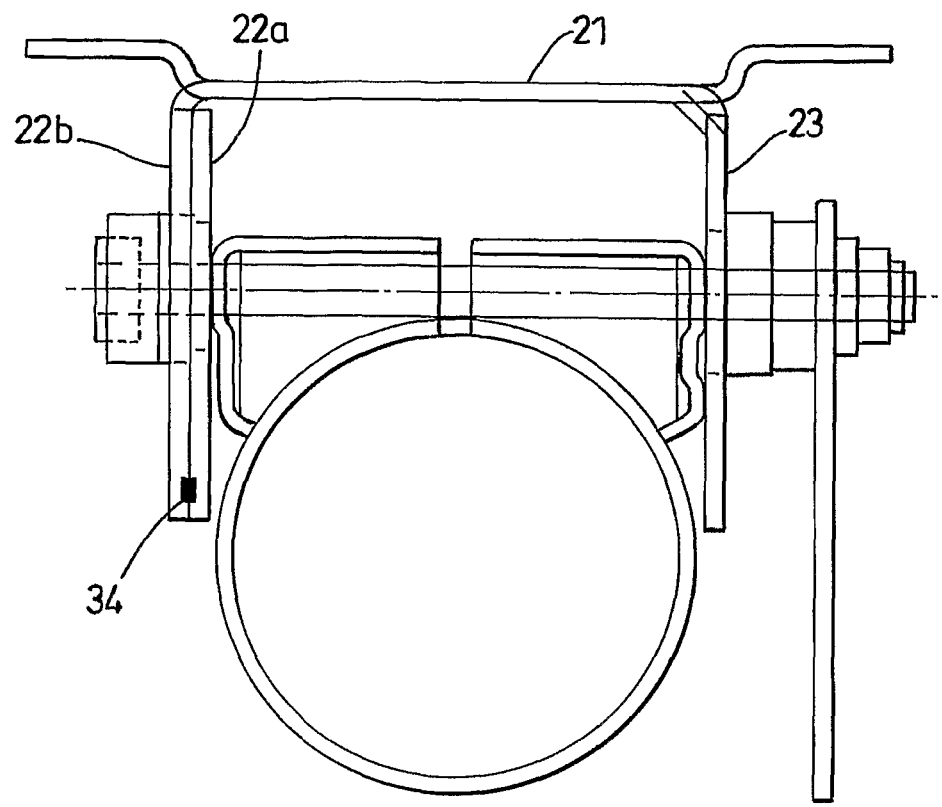
FIG. 3(a) is a cross section through a first embodiment of a clamp assembly of a steering column according to the invention when viewed along the axis of the steering column.
Figure 3B:
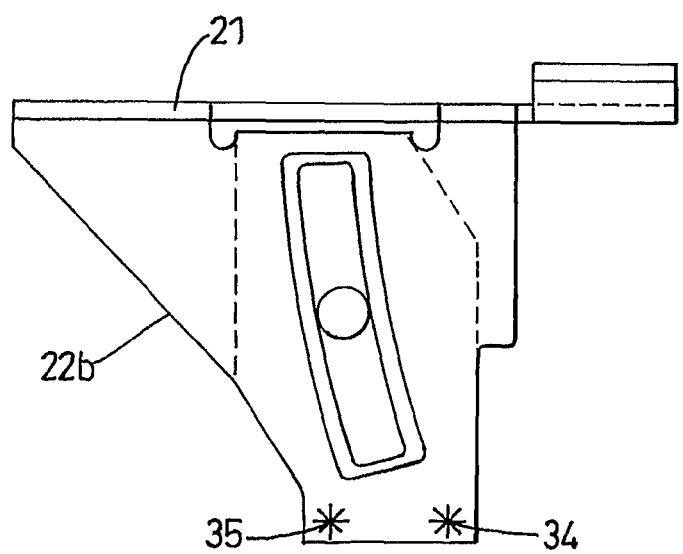
FIG. 3(b) is an alternative view of the bracket of FIG. 2(a) from the side.

An alternative embodiment of a steering column assembly in accordance with the inventions shown in FIGS. 3(a) and 3(b) of the accompanying drawings. This is similar to that of FIG. 2 and as such like reference numerals have been used to indicate like components. The key difference between this embodiment and that of FIG. 2 is that the inner leaf 22a is formed as a separate plate like member secured to the outer leaf 22b towards the free end of the outer leaf by spot welding. Two spot welds 34,35 can be used, or more if needed. As before the clamp mechanism should only act directly onto the inner leaf and not the outer leaf. An advantage of this arrangement is that leaves may be provided which have different thicknesses where this may create a more optimal design. The whole of the U-shape bracket except for the inner leaf could be made from a thicker plate than the inner leaf for example.

Figure 4:
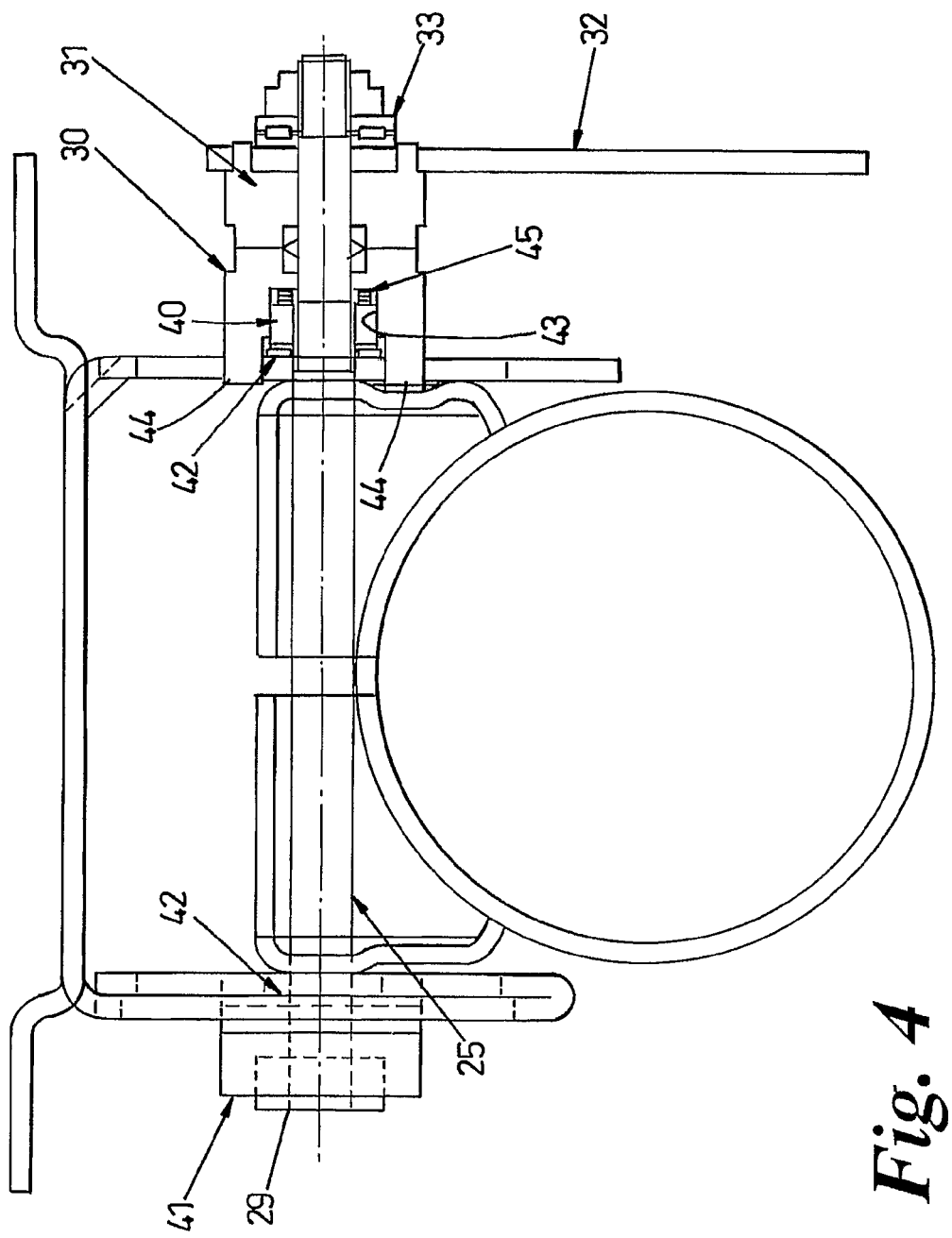
FIG. 4 is a view of a modification that can be made to the assemblies of FIGS. 1, 2 and 3 to provide a pre-load to the clamp mechanism.

FIG. 4 of the accompanying drawings shows an additional feature which may be incorporated into a steering column assembly such as those shown in FIGS. 1 to 3 of the accompanying drawings. This feature provides a pre-load to the clamp mechanism such that when it is unlocked some tension remains in the clamp shaft to prevent excess sideways movement of the steering column between the arms of the inverted U-shaped bracket. It also provides for precise adjustment of the pre-load and locked tensions.

In more detail, an additional adjustment nut 40 is threaded onto the end of the clamp shaft 25 outside of the more rigid arm 23. This nut 40 can be set, before the addition of the cam 30,31 and nut 33, so as to limit the amount by which the arms of the bracket can widen when the clamping is released. Plastic washers 42 (optional) are shown to provide a controlled, low, friction at the points of sliding contact between the bracket and the clamp shaft/lock nuts so ensure that rake adjustment can be achieved under a consistent maximum load even when tension is present in the unclamped condition.

The additional adjustment nut 40, which may be any hexagonal nut of a suitable thread, is located within a cavity 43 in a fixed part of the cam. The cam 31 is also keyed to the bracket to prevent it from rotating. This is arranged, in this embodiment, by two upstands 44 on the cam 31 which engage accurately within the vertical slot provided in the more rigid arm. The cavity is of hexagon form to complement the adjustment nut so that once the adjustment nut is set it cannot rotate. A similar arrangement is provided at the other side of the bracket, with the nut 29 being held captive within a block 41 that is keyed to the bracket to prevent its rotation.

Also shown is a small helical spring 45 that acts between the head of the adjustment bolt and the inside of the cavity of the fixed cam. This serves to bias the fixed cam away from the bracket into engagement with the moving cam portion to prevent the assembly from rattling when in the unlocked position.

In accordance with the provisions of the patent statutes, the principle and mode of operation of the steering column assembly have been explained and illustrated in its preferred embodiment. However, it must be understood that the steering column assembly may be practiced otherwise than as specifically explained and illustrated without departing from its spirit or scope.

The invention claimed is:

1. A steering column assembly comprising a steering column shroud which supports a steering shaft for a steering wheel, a support bracket which is fixed in position relative to a part of a vehicle, and a clamp mechanism which is movable between a locked position in which said clamp mechanism fixes said shroud in position relative to said support bracket and an unlocked position in which said clamp mechanism permits movement of said shroud relative to said support bracket, wherein said support bracket comprises a generally U-shaped member having first and second depending arms which extend from a base, a portion of said column shroud being located between said arms and a clamp mechanism which upon locking of said clamp mechanism provides tension between said first and second arms of said U-shaped member thereby clamping said steering column shroud in position, and wherein the first depending arm of said U-shaped member comprises an outer leaf extending from said base to a free end of said first depending arm and an inner leaf connected to said free end of said first depending arm and extending upwards from said free end towards said base, said inner leaf being located between said outer leaf and the second depending arm of said U-shaped member, said clamp mechanism acting to apply tension between said inner leaf and said second depending arm, such tension acting to pull said inner leaf away from said outer leaf.

2. A steering column assembly according to claim 1 wherein said base of said U shaped bracket is located above a portion of said column assembly, as is said clamp mechanism.

3. A steering column assembly according to claim 1 wherein said inner leaf and outer leaf of said first depending arm are integrally formed.

4. A steering column assembly according to claim 3 wherein said inner leaf and outer leaf are formed by providing an over length arm and bending it back on itself at a point along its length corresponding to a desired length of said outer leaf.

5. A steering column assembly according to claim 1 wherein said inner leaf comprises a separate component which is secured to said outer leaf at or near said free end of said first depending arm.

6. A steering column assembly according to claim 5 wherein said inner leaf is secured by welding.

7. A steering column assembly according to claim 5 wherein said inner leaf and said outer leaf are of different thicknesses.

8. A steering column assembly according to claim 1 wherein said clamp mechanism includes a clamp bolt that connects said inner leaf and said second depending arm, said bolt comprising a shaft which is provided with a nut or bolt head at one end, said bolt head/nut passing cleanly through an opening in said outer leaf yet prevented from passing through an opening in said inner leaf.

9. A steering column assembly according to claim 1 wherein said second depending arm is of greater rigidity than said first depending arm providing a relatively fixed datum for securing said column.

10. A steering column assembly according to claim 1 wherein said shroud is telescopic and comprises an inner member and an outer member, said inner member being at least partially received within said outer member and wherein said arms of said U-shaped member clamp on to a portion of said outer or inner members, or to a fixing rail secured thereto.

11. A steering column according to claim 10 wherein an engagement between said inner leaf and said fixing rail is over a smaller vertical distance than an engagement between said fixing rail and said second depending arm.

12. A steering column assembly of claim 10 wherein said outer member, or said fixing rail, is provided with at least one slit in a region fixed by said clamp such that an action of locking said clamp closes said slit and so deforms said outer member so that it grips said inner member.

* * * * *